July 15, 1958  C. G. ROLIN  2,842,905
WORK HOLDER
Filed April 13, 1953  3 Sheets-Sheet 1
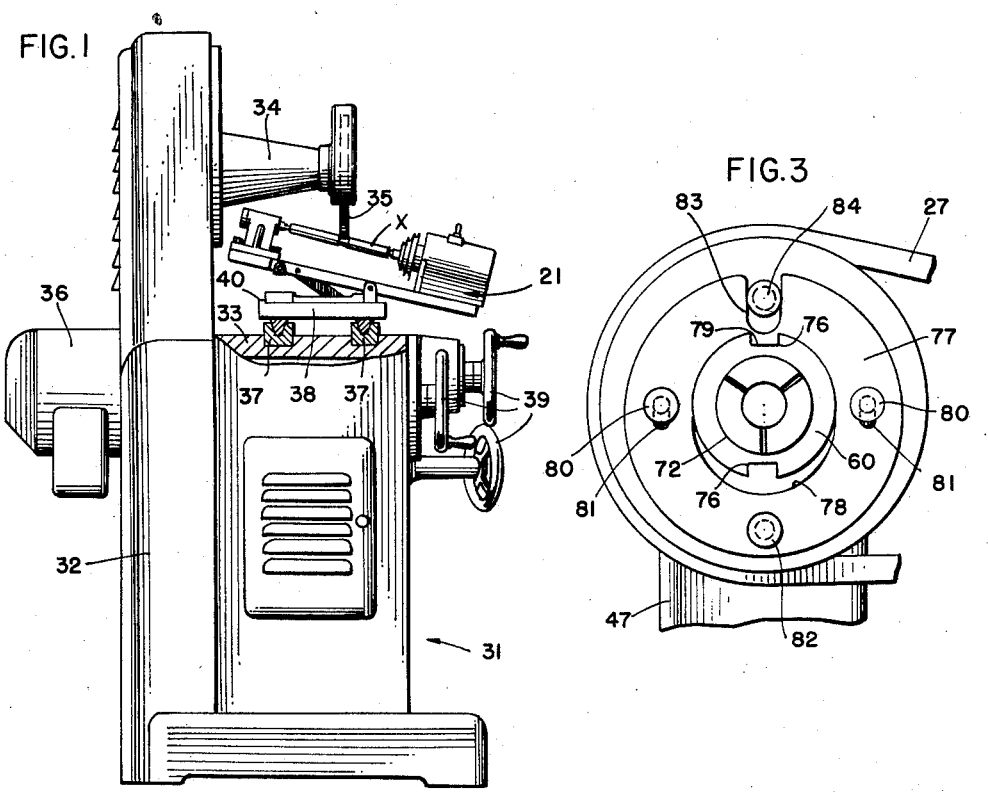
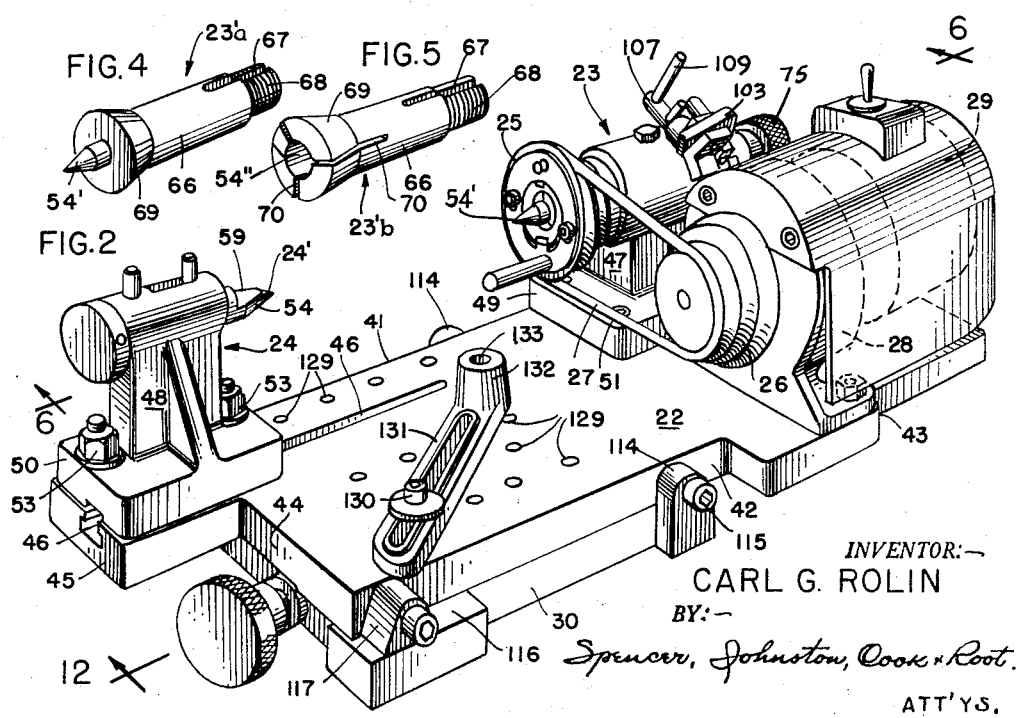
INVENTOR:—
CARL G. ROLIN
BY:—
Spencer, Johnston, Cook & Root.
ATT'YS.

July 15, 1958
C. G. ROLIN
2,842,905
WORK HOLDER
Filed April 13, 1953
3 Sheets-Sheet 2
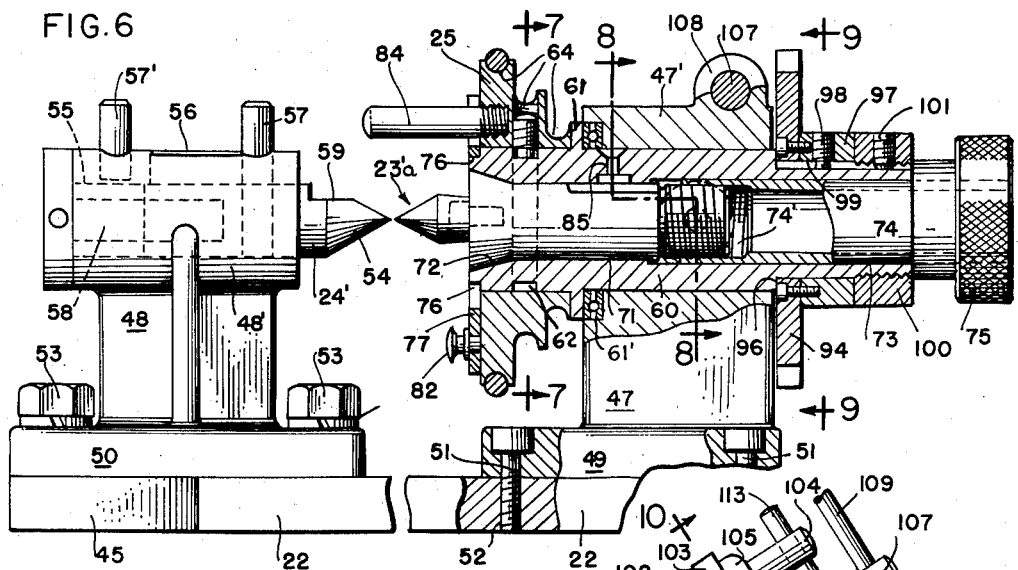
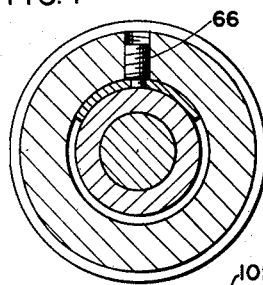
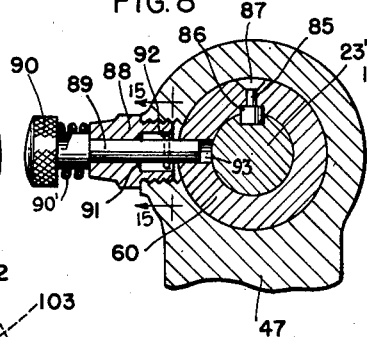
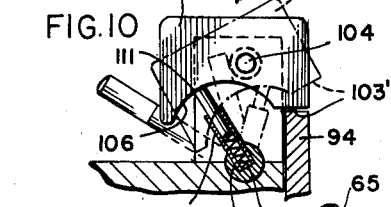
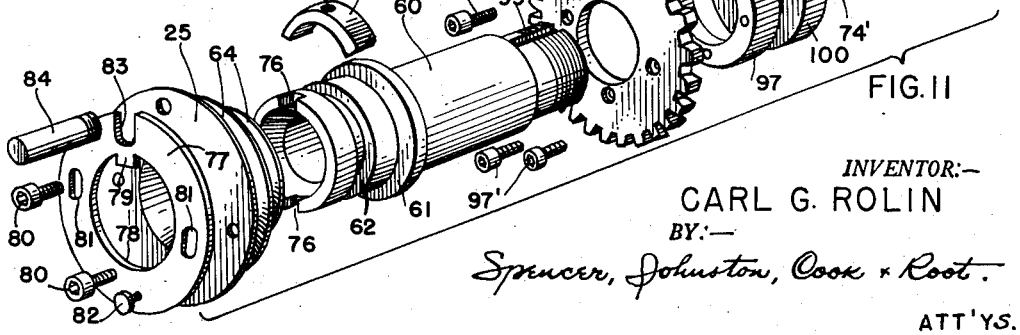
INVENTOR:—
CARL G. ROLIN
BY:—
Spencer, Johnston, Cook & Root.
ATT'YS.

July 15, 1958  C. G. ROLIN  2,842,905
WORK HOLDER
Filed April 13, 1953  3 Sheets-Sheet 3
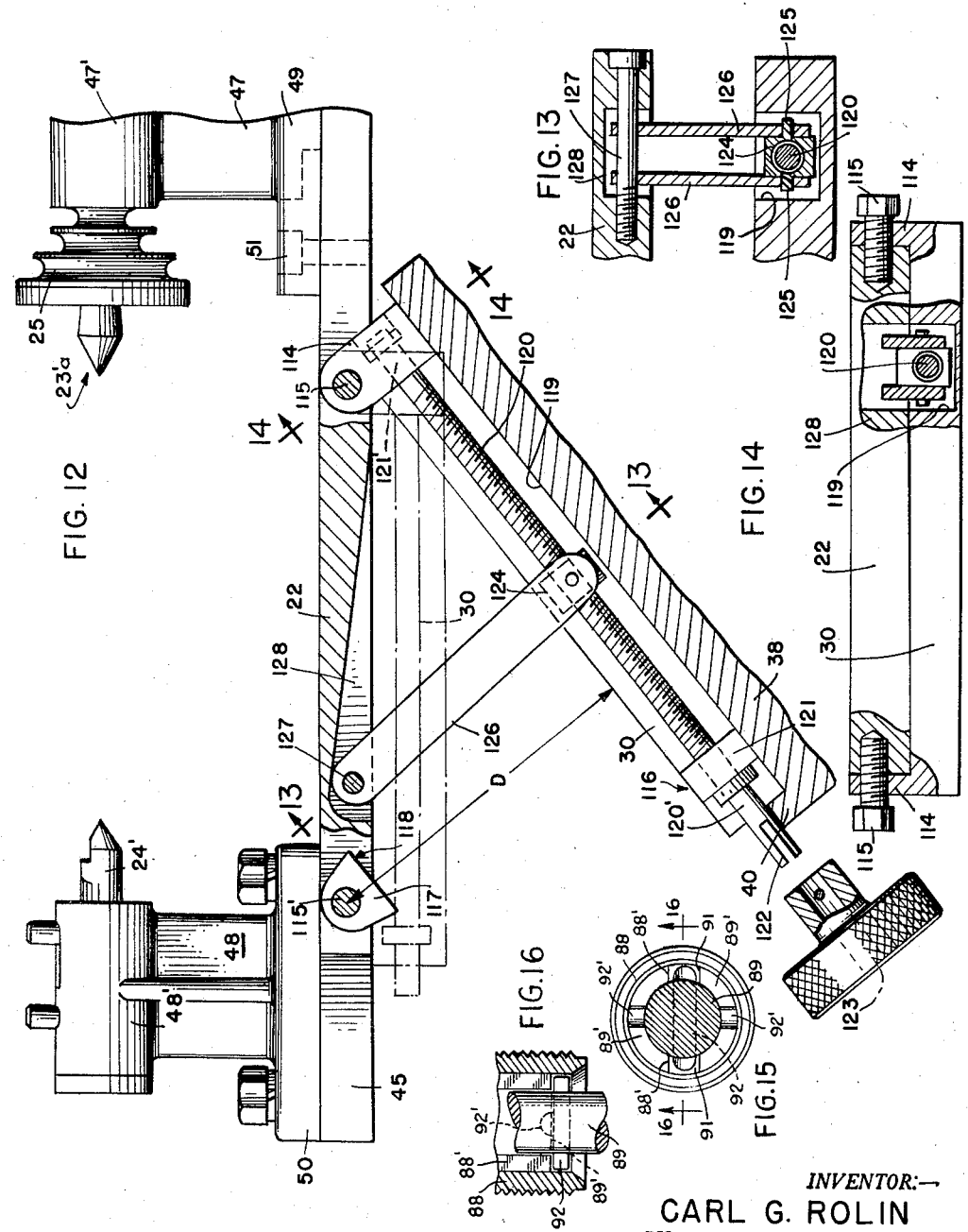
INVENTOR:—
CARL G. ROLIN
BY:—
Spencer, Johnston, Cook & Root
ATT'YS.

United States Patent Office 2,842,905
Patented July 15, 1958

2,842,905

WORK HOLDER

Carl G. Rolin, Cicero, Ill.

Application April 13, 1953, Serial No. 348,194

1 Claim. (Cl. 51—216)

The present invention relates in general to work holders and has more particular reference to a holder particularly well suited for supporting workpieces in position to be formed in a grinding machine, the invention more especially pertaining to an improved holder for rod-like workpieces.

An important object of the invention is to provide a holder for supporting a workpiece at any desired accurately determined inclination on a work table; a further object being to provide a holder having improved, simplified and readily adjustable sine bar mechanism for accurately determining the inclination at which a workpiece may be supported by the holder.

Another important object is to provide an improved holder for turnably supporting either a sleeve collet or a center collet; a further object being to provide readily adjustable means for turning a workpiece selectively through a sleeve collet, when mounted therein, or to turn a workpiece by means of an eccentric drive pin when the same is carried on a center collet.

Another important object is to provide readily and selectively adjustable means allowing a workpiece mounted in a collet to be either turnably driven or to be held stationary in its mounting.

Another important object is to provide a holder for a workpiece supporting collet, including improved, simplified, readily operable, and exceedingly precise indexing means for a workpiece holding collet mechanism.

Another important object is to provide, in a holder of the character mentioned, an auxiliary support pedestal and means whereby the pedestal may be adjusted easily to any desired position with respect to a workpiece supported in the structure.

Another important object is to provide a simplified, inexpensive and readily releasable tailstock structure.

The foregoing and numerous other objects, advantages and inherent functions of the invention will become apparent as the same is more fully understood from the following description which, taken in conjunction with the accompanying drawings, discloses a preferred embodiment of the invention for the purpose of demonstrating the same.

Referring to the drawings:

Figure 1 is a partially sectionalized elevational view showing a conventional grinding machine carrying a workpiece holder embodying the present invention;

Figure 2 is a perspective view of the work holder including a collet supporting headstock shown in position carrying a center collet in operative workpiece supporting position therein;

Figure 3 is an enlarged face view of the collet mounting tailstock showing a sleeve collet mounted therein in operative position;

Figures 4 and 5 are perspective views respectively showing a center collet and a sleeve collet of the sort adapted to be selectively mounted in the holder;

Figure 6 is a sectional view taken substantially along the line 6—6 in Figure 2;

Figures 7, 8 and 9 are sectional views respectively taken along the lines 7—7, 8—8 and 9—9 in Figure 6;

Figure 10 is a sectional view taken substantially along the line 10—10 in Figure 9;

Figure 11 is an exploded assembly view showing, in perspective, the several parts of the collet mounting tailstock structure;

Figures 12, 13 and 14 are sectional views respectively taken along the lines 12—12 in Figure 2, and lines 13—13 and 14—14 in Figure 12;

Fig. 15 is an enlarged sectional view taken substantially along the line 15—15 in Fig. 8; and Fig. 16 is a sectional view taken substantially along the line 16—16 in Fig. 15.

To illustrate the invention, the drawings show a work holder 21 comprising a support plate 22, with headstock and tailstock assemblies 23 and 24 mounted on the plate 22. The tailstock assembly comprises means for mounting a tailstock pin element 24' in the holder, while the headstock assembly 23 provides means for supporting a collet element 23'a, or a sleeve collet 23'b in coaxial alinement with the tailstock element 24', the assembly including pulley means 25, adapted selectively to be drivingly connected with and disconnected from a collet element 23'a or 23'b when the same is mounted in the headstock assembly.

The structure also includes driving pulley means 26 mounted on the plate 22 in spaced registration with the pulley means 25, a belt 27 being provided for drivingly interconnecting the pulley means 25 and 26. Means preferably comprising reduction gearing 28 and a motor 29 may be provided on the plate 22 for driving the pulley means 26; and the structure may include adjustable means comprising a mounting plate for supporting the plate 22 and the mechanism carried thereby adjustably at any desired inclination with respect to the mounting plate 30.

The holder of the present invention is particularly well suited for supporting a rod-like workpiece X at any desired inclination on a work table, such as may be found in conventional machines, like the grinding machine 31 illustrated in Figure 1 of the drawings. The present invention, of course, is not in any way limited or restricted to the machine in which the holder of the present invention may be used. As shown, however, the machine 31 comprises frame means 32 forming a bed 33, a sub-frame 34 movable toward and away from the bed, and carrying a turnable grinding member 35 which may comprise a wheel carried on a shaft turnable in the frame 34, the grinding machine including motor means 36 drivingly connected with the wheel shaft to turn the wheel 35 at desired grinding speed.

The bed 33 may provide trackways 37 supporting a work table 38 for guided movement beneath the wheel 35, such movement usually and preferably being provided in the direction of the plane of the wheel as shown, although the structure of the grinding machine may provide for table movement in a direction transversely of the plane of the wheel 35, if desired, the machine being provided with manually operable hand wheels 39 for accomplishing the vertical adjustment of the wheel carrying subframe 34 and for moving the table 38 on the bed 33 beneath and with respect to the wheel 35 for the purpose of supporting a workpiece or pieces in grinding position with respect to the wheel. In this connection, the table 38 may comprise magnetic means for holding workpieces directly thereon or for mounting work holders on the table; and the table may provide a longitudinal work alining rib 40 preferably at and along the inner edge thereof, against which rib workpieces or holders may be abutted to accurately determine the position thereof on the table.

The plate 22 preferably is of generally rectangular configuration having a pair of opposite side edges 41 and 42, and end edges 43 and 44. The plate 22 also preferably has an extension 45 projecting at the end edge 44, a side edge of said extension forming a continuation of the side edge 41 of the plate. The plate 22 may also be formed with an undercut slot 46 opening upwardly in the plate and extending therein and in the extension 45 in position spaced inwardly of and extending parallel with respect to the edge 41. This slot may extend from the outer end of the extension 45 to, and the same may terminate at, the medial portions of the plate 22, or the slot may extend from one end of the plate 22 to the other. The head and tailstock assemblies 23 and 24 are respectively mounted on and supported by pedestals 47 and 48 having sleeve-like portions 47' and 48', and base plates 49 and 50.

The headstock pedestal 47 may be mounted in the corner of the plate formed by the intersection of its edges 41 and 43, with the axis of the sleeve portion 47' lying in the plane extending vertically of the plate through the slot 46, said pedestal being preferably secured on the plate 22 by means of fastening studs 51 threadedly secured in openings 52 in the plate 22. These studs 51 preferably embody heads adapted to seat in countersunk sockets formed in the base plate 49 of the headstock pedestal 47. The tailstock assembly 24 may also be secured on the plate 22 for adjustment toward and away from the headstock assembly, along the slot 46, with the axis of the pin element 24' at all times extending in alinement with the axis of the sleeve 47'. To this end, the tailstock assembly may be secured by means of bolts having heads slidably received in the undercut portions of the slot 46 and stems extending upwardly of the plate 22 through the slot 46. These upwardly extending stems may be received through bolt openings formed in the base 50 of the tailstock pedestal, the terminal portions of the stems projecting upwardly of said base in position to receive clamping nuts 53 adapted to be tightened on the stems to clamp the pedestal on the plate 22 and to be loosened to allow adjustment of the tailstock pedestal on the plate in the longitudinal direction of the slot 46.

The head and tailstock assemblies may thus be mounted on the plate 22 in oriented position such that the sleeve portions 47' and 48' and the collet and tailstock elements 23'a or 23'b and 24', which are carried in the said sleeve portions, are at all times precisely in coaxial alinement, in all adjusted positions of the tailstock assembly in the longitudinal direction of the slot 46. The head and tailstock assemblies thus may be adjusted in any desired spaced apart relationship on the plate 22, within the limit of adjustment of the tailstock assembly on the plate 22 away from the headstock assembly, in order to accommodate rod-like workpieces of various lengths. It will be seen also that the tailstock assembly may be readily removed from the plate 22 merely by loosening the clamping nuts 53 and sliding the pedestal 48 on the plate 22 beyond the end of the extension 45 to thereby disengage the heads of the tailstock holding bolts from the slot 46 through the open end thereof.

The tailstock element 24' preferably comprises a cylindrical pin having a conical point 54 at one end adapted to engage in a corresponding socket formed in the tailstock facing end of a rod-like workpiece to be mounted in the holder. The pin is snugly yet slidably fitted in a bore 55 formed in the sleeve portion 48' of the pedestal 48. Means is provided whereby the element 24' is normally supported on the pedestal with its conical end 54 projecting outwardly at one end of the sleeve portion, such means being operable at will to retract the conically pointed end of the element 24' within said sleeve. To this end, the sleeve may be formed with a longitudinal slot 56, and the pin forming the element 24' may carry a radial stem 57 mounted therein and extending in the slot 56 and outwardly of the cylindrical portion 48' of the pedestal. Spring means 58 may be provided within the bore 55 for normally urging the stem in a direction to project the conically pointed end thereof outwardly of one end of the bore, the stem 57 when at one end of the slot 56 forming a stop for limiting the projecting movement of the pin in the bore 55. The sleeve portion 48' of the pedestal 48 may also be fitted with a projecting stem 57', at the opposite end of the slot 56, so that by pressing the stem 57 toward the stem 57', as by grasping the same, the pin 24' may be drawn into the bore 55 against the influence of the spring 58, to release the point 54 of the pin from the end of a workpiece. If desired, the upper side of the pin 24' may be ground to provide an upwardly facing flat portion 59, at the juncture of the conical point 54 with the cylindrical body of the pin.

The headstock assembly comprises means to mount a workpiece holding collet element 23'a or 23'b on the pedestal 47 in such fashion as to permit the collet element to be turned about its longitudinal axis or to be held against rotation in the assembly, the collet in either case being supported in coaxial alinement with the tailstock pin element 24'. The headstock assembly may also include means for indexing the supported collet element in any desired angularly shifted position in the headstock assembly. To these ends, the headstock assembly may comprise a sleeve-like collet holder 60 mounted in the sleeve portion 47' of the pedestal 47. The collet holder 60 is preferably formed with an outstanding peripheral rib or flange 61 spaced inwardly of the collet receiving end of the holder, said flange being adapted to overlie and ride upon one end of the sleeve portion 47' to form an end thrust bearing. If desired, of course, roller bearing means 61' may be interposed between the flange 61 and the facing end of the pedestal sleeve 47', as shown in Fig. 6. The sleeve-like holder 60, between the flange 61 and its collet receiving end, may be formed with a peripheral groove 62 adapted to receive an arcuately curved shoe 63. The pulley means 25 may comprise a wheel formed with one or more stepped belt grooves 64, the wheel being sized to turnably fit upon the sleeve-like holder 60 between its collet receiving end and the flange 61, in position overlying the groove 62; and the pulley wheel may be secured in place on the holder 60 as by means of a holding screw 65, threadedly secured in a radial screw hole in the wheel, and having an inner end adapted to engage in a socket formed in the shoe 63, whereby the shoe may anchor the pulley against axial displacement on the sleeve-like holder while permitting relative turning movement of the pulley wheel on the holder.

The headstock assembly is formed to receive either a center collet 23'a of the sort shown in Figure 4 having a conical point 54' at one end adapted for engagement in a corresponding socket formed in the headstock facing end of a workpiece, or to receive a sleeve-like collet element 23'b of the sort shown in Figure 5 having an axial cavity 54" sized to receive an end of a rod-like workpiece. In either case, the collet element comprises a cylindrical body portion 66 which at one end may be formed with a longitudinal spline groove 67 and screw threads 68, and at the other end with a conical portion 69 forming the work engaging end of the collet. The conical point 54' of the center collet may be formed on and project from the conical end portion of the element. The axial cavity 54" of the sleeve-like collet element may be formed in and may open at the conical end of the element, said element being formed with longitudinal slits 70 in its conical end portions. Either of the collet elements shown in Figures 4 and 5 may be secured in the sleeve-like holder 60 which is formed with an internal bore having a portion 71, at one end of the holder, sized to snugly receive the cylindrical body portion 66 of either of the collet elements. The bore may be formed with a flared portion 72 opening at the collet receiving end of the holder 60, the flared portion 72 of the bore conforming with and being adapted to seatingly receive the conical portion 69 of either of the collet elements.

At its end remote from the flared portion 72, the holder 60 may be formed with a bore 73 communicating with and forming an extension of the bore portion 71, the bore 73 being sized to snugly receive a clamping tube 74 having an end extending outwardly of the sleeve-like holder 60 and carrying a manually operable knob 75 secured thereon. The opposite end of the clamping stem 74 may be formed with an internally threaded socket 74' for engagement with the threads 68 of a collet element so that, by inserting the element in the holder 60 and by operating the knob 75 of the clamping stem, a collet element 23'a or 23'b may be clampingly received and held in the holder 60.

The collet holding end of the holder 60 may be formed with notches 76 on opposite sides thereof; and a ring-like driving plate 77 having a central opening 78, sized to receive the end of the collet holder 60, may be mounted on the face of the pulley means 25 in position encircling the notched end of the holder 60, which may project slightly outwardly of the pulley means. The opening 78 of the ring-like plate 77 preferably has a minimum diameter in one direction sized to turnably receive the end of the holder 60 snugly between the opposite sides of the opening. The opening 78, however, may be enlarged to provide a maximum opening diameter in a direction at right angles to the direction of its minimum diameter, whereby the plate may be relatively shifted on the face of the pulley element 25 in the direction of the maximum diameter of the opening. The plate 77 also may be formed with a tongue 79 sized to snugly fit either of the notches 76, said tongue extending in the opening 78 on one side thereof, in alinement with the maximum diameter of the opening.

The plate 77, accordingly, may be selectively engaged with the collet support 60, by shifting it into position to engage the tongue 79 with one or other of the notches 76, or the plate may be drivingly disengaged from the collet support by moving it into position with the tongue 79 disposed outwardly of the notches 76. Screw threaded clamping studs 80, having manually turnable knobs, may be provided for clamping the plate 77 on the pulley means 25, in either of its relatively shifted positions, said studs having stems extending in slots 81 formed in the plate 77 and elongated in the direction of the maximum diameter of the opening 78, said studs also having threaded ends formed for threaded engagement in openings in the pulley means 25.

The plate 77 may also be provided with a projecting knob or handle 82 for aiding in the adjustment of the plate 77 on the pulley means when the studs 80 have been loosened to permit movement of the plate, the handle 82 being preferably mounted on the plate 77, on one side thereof in alinement with the maximum diameter of the opening 78. The plate 77, opposite from the handle 82, may be provided with a peripherally opening notch 83 extending in alinement with the maximum diameter of the opening 78 and having spaced side edges sized to slidingly receive therebetween an elongated driving pin 84, threadedly or otherwise secured at one end in the pulley means 25.

It will be seen from the foregoing that the plate 77, being fastened on the pulley means 25, will rotate therewith when the pulley is driven. By adjusting the plate 77 in position with its tongue 79 in one of the notches 76, rotation of the pulley means 25 will drivingly turn the collect holder 60 in the pedestal 47 and, hence, will turn a collet mounted in the sleeve-like holder 60. As a consequence, when a sleeve collet, of the sort shown in Figure 5, is mounted in the holder 60, such collet and a workpiece clampingly secured therein may be driven by the pulley means 25. On the other hand, by adjusting the plate 77 to position the tongue 79 radially outwardly of the sleeve member 60, thereby disengaging the tongue 79 from the notches 76, the collet holder 60 will be drivingly disengaged from the pulley, whereby said holder may remain stationary in the pedestal 47 while the pulley rotates freely on the collect holder 60. Accordingly, a center collet, of the sort shown in Figure 4, may be secured in the holder 60 and held stationary therein to support a workpiece between the pointed end portion 54' of the center collet and the cooperating point 54 of the tailstock pin. A workpiece so mounted may, of course, be turned on and between the stationary pointed portions 54 and 54' by means of a driving dog connected with the workpiece and having an arm extending in position to engage with the pin 84. Said pin, being secured on the pulley, is of course adapted to turn with the pulley about a stationary center collect mounted in the sleeve 60 and, hence, drivingly to turn a rod or stem-like workpiece on the work supporting point portions 54 and 54'.

The structure thus provides for mounting a collet, whether it be a sleeve collet or a center collet, for rotation in the holder 60 when drivingly connected with the pulley element 25; and either type of collet may be held stationary in the collet support 60.

In order to secure a supported collet against relative turning movement in the holder 60, the same may be provided with a radial stem 85 having a head 86 extending within the collet receiving bore of the holder in position to form spline engagement with the longitudinal spline groove 67 of the collet. The outer end of the stem 85, remote from the spline portion 86, may be formed as a rivet head 87 seated in a countersunk opening formed in the outer surface of the sleeve-like holder 60.

Means may also be provided for latching the collet holding sleeve against turning movement in the pedestal 47. To this end, the pedestal may be provided with a sleeve member 88 having a bore extending radially of and opening upon the holder 60, and a latching stem 89 may be carried in the bore of the sleeve member. The outer end of the stem 89 may be provided with a manually operable knob or handle 90 whereby to move the stem axially in the sleeve member 88. To limit the outward movement of the stem, the sleeve member 88 may be provided with an internal annular shoulder 91, and the stem may be fitted with a diametral pin 92 having opposite ends extending outwardly of the stem in position to engage with shoulder means 91 to limit the outward movement of the stem in the sleeve member 88, the limit of outward movement being such as to permit retraction of the inner end of the stem outwardly of the sleeve member 60, which may be formed with a radial bore 93 sized to receive the inner end of the stem. Accordingly, when the stem is in retracted position, the collet holder 60 may be freely turned on the pedestal 47. However, by turning the holder 60 to present the radial bore 93 in alinement with the stem 89, the same may be moved inwardly to interfit its inner end in the bore 93 and thereby lock the collet holder against turning movement on the pedestal 47. If desired, spring means 90' may be provided for normally urging the stem radially outwardly of the collet holder toward releasing position, and means may be provided for releasably securing the pin in holder latching position against the urge of said spring. This may be accomplished, as shown in Figs. 15 and 16, by forming the interior of the sleeve member 88 with longitudinal grooves 88' having ends forming the shoulder means 91 medially of the member 88, the grooves 91 opening toward the inner end of the sleeve member upon circumferentially extending shoulders 89' formed with pin seats 92' medially between the grooves 91 and facing toward the inner end of the sleeve. The knob 90 may be pressed to move the stem 89 against the influence of the spring 90' sufficiently to project the pin 92 outwardly of the grooves 88', and the knob may then be turned to engage the ends of the pin 92 with the shoulders 89', as at the seats 92', to hold the stem 89 in depressed position with the inner end thereof lockingly engaged in the radial bore 93 of the holder 60. This facility is useful in securing the holder 60 against turning movement during the interval when a collet 23′a or 23′b is being clamped in the holder by operation of the clamping knob 75, and at other times whenever desirable.

Means also may be provided for indexing the collet support. To this end, an index wheel 94, having a plurality of circumferentially spaced radial teeth 95, may be mounted and secured on the collet holder 60, preferably on the portions thereof which extend outwardly of the pedestal 47 remote from the pulley element 25. To so mount the wheel 94, the sleeve-like collet holder 60 may be provided with an annular shoulder 96 against which the indexing wheel 94 may be clampingly secured. The indexing wheel is preferably secured on a hub 97, as by means of studs 97′. The wheel and hub are preferably sized for a smooth sliding fit with the collet holder 60 and may be splined thereto as by means of a radial stud 98 mounted in the hub 97 and having an inner end adapted for splined engagement in a spline groove 99 formed in the collet holder. The outer end of the collet holder also may be threaded for the reception of a correspondingly threaded holding collar 100, which may be provided with a radial locking screw 101 adapted to seat in the groove 99.

The indexing means may also comprise suitable latch means. As shown, such latch means preferably comprises a novel latch structure mounted on the pedestal portion 47′ adjacent the index wheel 94. This latch structure comprises a detent member 103 rockably mounted on a support pin 104 carried in spaced ears 105 formed on the pedestal portion 47′. The detent member 103 has an edge portion 103′ in position to engage between the peripheral teeth 95 of the index wheel and thereby latch the wheel and the collet holder 60 against rotation in any one of a plurality of indexing positions determined by the spacement of the teeth 95 in the indexing wheel 94. The member 103, however, is adapted to be rocked from wheel latching position to wheel releasing position, said positions being shown respectively in solid and in dotted lines in Figure 10 of the drawings, the latching portion 103′ being in position retracted from the teeth of the indexing wheel, when in wheel releasing position.

In order to shift the member 103 between latching and releasing positions, a side of the detent member 103 is provided with a curved cam edge 106 facing away from the axis of the pin 104 and toward the axis of a latch actuating shaft 107 rockably carried in a journal 108 formed on the pedestal portion 47′, the pin 104 and shaft 107 being spaced apart and parallel. The end of the shaft 107, outwardly of its journal 108, may be provided with a radial handle 109 for rocking the shaft 107 manually. Opposite the latch member 103, the shaft 107 is provided with a radial sleeve 110 carrying an axially slidable pin 111 therein, the pin being normally urged in the sleeve 110 in a direction radially outwardly of the axis of the shaft 107, as by means of a spring 112, whereby to apply and resiliently press the outer end of the pin 111 upon the curved cam surface 106 of the latch member 103. By operating the handle 109 to rock the shaft 107 in a counterclockwise direction, viewing Figure 10, the pin 111 will be moved on the cam surface into position, on one side of the plane which is common to the axes of the pin 104 and shaft 107, to yieldably press and urge the latch member 103 toward latching position with the teeth of the wheel 94. By rotating the shaft 107 in a clockwise direction, viewing Figure 10, the pin 111 will ride on the cam surface 106 into position on the opposite side of said plane and thereby urge and move the latch member 103 to the retracted dotted line position shown in Figure 10 releasing the latch member 103 from the indexing wheel. When in retracted position, a radial pin 113 on the shaft 107 may engage an extension of the pin 104 to limit further movement of the latch mechanism in the latch releasing direction, movement of the latch mechanism in the opposite direction being limited by engagement of the member 103 with the wheel 94. It will be seen from the foregoing that the latching mechanism functions as a toggle whereby movement of the actuating pin 111, on opposite sides of the plane containing the axes of the pin 104 and shaft 107, yieldingly urges the latch member 103 in one direction or the other by virtue of the thrust exerted on the actuating pin 111 by the spring 112, the mechanism being exceedingly simple, yet positive, in action.

In order to provide simple, yet accurate, means for adjusting the angularity at which a workpiece, such as the member X, is supported on a work table 38, the adjustable mounting plate 30 is provided with a pair of spaced apart upstanding ears 114 which may be pivotally connected with the plate 22, as at the opposite sides thereof, by means of accurately fitted pivot studs 115 adapted pivotally to interconnect the plates 22 and 30 for rocking movement about an axis lying in a plane normal to the plane of the plate 22 which intersects the axis of the collet support sleeve 60 at right angles. Remote from the ears 114, the plate 30 is formed with an accurately finished surface 116; and the plate 22 opposite said surface 116 carries a gauge block 117 having an accurately finished surface 118, said gauge block 117 being pivotally mounted on the plate 22, as at an edge thereof, as by means of an accurately fitted pivot stud 115′, the axis of which extends precisely in parallel spaced relation with respect to the axes of the pivot studs 115.

The arrangement of the pivot studs 115 and 115′, and the accurately finished surfaces 116 and 118, is such that when the plates 22 and 30 are closed together with the surfaces 116 and 118 in contact, the lower surface of the plate 30, which is also accurately finished, is exactly parallel with respect to the alined axes of the tailstock member 24′ and of a collet mounted in the holder 60, that is to say, exactly parallel with respect to the axis of a supported workpiece X.

Means is provided for adjusting the relative angular position of the plates 22 and 30 about the alined axes of the studs 115. To this end, the plate 30 may be formed with a groove 119 extending from one end of the plate to its opposite end in a direction substantially at right angles with respect to the alined axes of the pivot studs 115. In this groove is arranged a screw threaded stem 120 turnably mounted in bearings 121 and 121′ at the opposite ends of the plate 30. The stem 120 may have an end 120′ projecting outwardly of the plate at the end thereof remote from the pivot studs 115, said projecting end being preferably formed, as by means of a diametral slot 122, for detachable connection with a manually operable knob 123 to facilitate the turning of the threaded stem. Between its journaled ends, the stem may carry a nut 124 threadedly engaged therewith, said nut being provided with outstanding pivots 125 on the opposite sides thereof for pivotal connection with a pair of links 126. These links extend to and are pivotally connected on a pivot pin 127 mounted in the plate 22 preferably in a groove 128 formed in the under side of said plate.

By turning the stem 120 in one direction or the other, as by means of the knob 123, the plates 22 and 30 may be relatively moved about the axes of the pivot studs 115 to any desired angularity within a limit imposed by the length of the links 126, the extent of such relative angular movement being illustrated in solid and dotted lines in Figure 12 of the drawings. Operation of the stem 120 may thus be employed, in conjunction with precision measuring blocks applied between the surfaces 116 and 118, to accurately determine the vertical distance D therebetween, whereby to determine the relative angularity of the plates 22 and 30 in accordance with the so-called sine bar principle of angularity determination. The plates 22 and 30 thus may be accurately adjusted to any desired relative angular position, hence determining accurately the angle at which a workpiece X, mounted in the holder, is supported with respect to the plate 30, that is to say, with respect to a work table 38 upon which the support plate 30 is mounted.

If desired, the plate 22 may be formed with a plurality of spaced apart threaded stud openings 129 for the reception of a fastening stud 130 in any selected one of the openings 129 to thereby anchor a pedestal member 131 in any desired position on the plate member 22. The pedestal member 131 may provide a portion 132 formed with an upwardly opening socket or cavity 133 adapted to receive and support any tool, gauge, or latch device that may be required for use in connection with the workpiece X.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein being preferred embodiments for the purpose of illustrating the invention.

The invention is hereby claimed as follows:

A work holder comprising a mounting plate, collet carrying means on said mounting plate, means for supporting said mounting plate at a desired inclination on a work table comprising a carrying plate disposed beneath and pivotally connected on said mounting plate for relative tilting movement about a common pivot axis, a screw threaded adjusting stem turnably journaled on said carrying plate in position extending at right angles with respect to said pivot axis, a nut threadedly connected with said adjusting stem, and a link pivotally connected with said nut and with said mounting plate for rocking movement with respect to the mounting plate about a tilting axis spaced from and parallel with respect to said common axis, said adjusting stem having an end projecting at a side of said carrying plate remote from said common axis, said projecting end being formed for connection with a stem turning member, one of said plates forming a gauging surface remote from said common axis and the other of said plates carrying a gauging member pivotally secured thereto for turning movement on an axis spaced from and parallel with respect to said common axis, said gauging member having a gauging face adapted to bear upon said gauging surface when said plates are in a predetermined datum position of relative angularity about said common axis.

References Cited in the file of this patent
UNITED STATES PATENTS

| | | |
|---|---|---|
| 728,572 | Hanson | May 19, 1903 |
| 1,238,935 | Olson | Sept. 4, 1917 |
| 1,303,607 | Smith | May 13, 1919 |
| 1,503,687 | Hunt | Aug. 5, 1924 |
| 2,214,166 | Hertlein | Sept. 10, 1940 |
| 2,303,459 | Hinderer | Dec. 1, 1942 |
| 2,428,248 | Strong | Sept. 30, 1947 |
| 2,645,067 | Hinderer | July 14, 1953 |